(12) United States Patent
Pennington

(10) Patent No.: US 9,021,045 B2
(45) Date of Patent: Apr. 28, 2015

(54) SHARING IMAGES IN A SOCIAL NETWORK

(75) Inventor: Havoc Pennington, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 1937 days.

(21) Appl. No.: 11/565,111

(22) Filed: Nov. 30, 2006

(65) Prior Publication Data
US 2008/0133658 A1    Jun. 5, 2008

(51) Int. Cl.
G06F 15/167 (2006.01)
H04L 29/08 (2006.01)
G06Q 10/10 (2012.01)

(52) U.S. Cl.
CPC ............ *H04L 67/1095* (2013.01); *G06Q 10/10* (2013.01)

(58) Field of Classification Search
USPC .......... 709/204, 206, 212, 213, 214, 219, 216
See application file for complete search history.

(56) References Cited

U.S. PATENT DOCUMENTS

| | | | |
|---|---|---|---|
| 6,018,768 A | 1/2000 | Ullman et al. | |
| 6,317,784 B1 | 11/2001 | Mackintosh et al. | |
| 6,519,648 B1 | 2/2003 | Eyal | |
| 6,526,411 B1 | 2/2003 | Ward | |
| 6,553,180 B1 * | 4/2003 | Kikuchi et al. | 386/241 |
| 6,714,722 B1 | 3/2004 | Tsukidate | |
| 6,763,345 B1 | 7/2004 | Hempleman et al. | |
| 6,957,398 B1 | 10/2005 | Nayeri | |
| 7,069,308 B2 | 6/2006 | Abrams | |
| 7,345,232 B2 | 3/2008 | Toivonen et al. | |
| 7,426,537 B2 | 9/2008 | Lee et al. | |
| 7,684,815 B2 * | 3/2010 | Counts et al. | 455/518 |
| 7,689,510 B2 * | 3/2010 | Lamkin et al. | 705/51 |
| 7,698,301 B2 | 4/2010 | Lourdeaux | |
| 7,730,216 B1 | 6/2010 | Issa et al. | |
| 7,886,010 B1 * | 2/2011 | Shankar | 709/206 |
| 2002/0016960 A1 | 2/2002 | Yamato et al. | |
| 2002/0042915 A1 | 4/2002 | Kubischta et al. | |
| 2002/0120925 A1 | 8/2002 | Logan | |
| 2002/0156852 A1 | 10/2002 | Hughes et al. | |
| 2002/0188947 A1 | 12/2002 | Wang et al. | |
| 2002/0194598 A1 | 12/2002 | Connelly | |
| 2003/0014419 A1 | 1/2003 | Clapper | |
| 2003/0028595 A1 | 2/2003 | Vogt et al. | |
| 2003/0028892 A1 | 2/2003 | Gewickey et al. | |
| 2003/0050976 A1 | 3/2003 | Block et al. | |
| 2003/0093790 A1 | 5/2003 | Logan et al. | |
| 2003/0115274 A1 | 6/2003 | Weber | |
| 2003/0115585 A1 | 6/2003 | Barsness et al. | |
| 2003/0135513 A1 | 7/2003 | Quinn et al. | |
| 2004/0078825 A1 | 4/2004 | Murphy | |
| 2004/0083273 A1 | 4/2004 | Madison et al. | |
| 2004/0128624 A1 | 7/2004 | Arellano et al. | |
| 2005/0004985 A1 | 1/2005 | Stochosky | |
| 2005/0022251 A1 | 1/2005 | Ohnuma et al. | |
| 2005/0038819 A1 | 2/2005 | Hicken et al. | |
| 2005/0097173 A1 | 5/2005 | Johns et al. | |
| 2005/0114340 A1 | 5/2005 | Huslak et al. | |
| 2005/0132401 A1 | 6/2005 | Boccon-Gibod et al. | |
| 2005/0138659 A1 | 6/2005 | Boccon-Gibod et al. | |
| 2005/0210285 A1 | 9/2005 | Williams | |

(Continued)

*Primary Examiner* — Yosef K Laekemariam
(74) *Attorney, Agent, or Firm* — Lowenstein Sandler LLP

(57) ABSTRACT

Embodiments of the present invention provide for a shared photo space that is synchronized among members of a social network or group. In some embodiments, users of a social group automatically pull photos directly from all registered hard drives of clients and online services and mirror them around the group, thus making the collection available to the social network of users.

17 Claims, 4 Drawing Sheets

(56) References Cited

U.S. PATENT DOCUMENTS

| | | |
|---|---|---|
| 2005/0251411 A1 | 11/2005 | Ishi et al. |
| 2005/0267766 A1 | 12/2005 | Galbreath et al. |
| 2005/0278377 A1 | 12/2005 | Mirrashidi et al. |
| 2006/0020614 A1 | 1/2006 | Kolawa et al. |
| 2006/0041902 A1 | 2/2006 | Zigmond |
| 2006/0143236 A1 | 6/2006 | Wu |
| 2006/0190824 A1 | 8/2006 | Montulli et al. |
| 2006/0195462 A1 | 8/2006 | Rogers |
| 2006/0195479 A1 | 8/2006 | Spiegelman et al. |
| 2006/0195516 A1 | 8/2006 | Beaupre |
| 2006/0195525 A1 | 8/2006 | Page et al. |
| 2006/0195532 A1 | 8/2006 | Zlateff et al. |
| 2006/0212906 A1 | 9/2006 | Cantalini |
| 2006/0239131 A1 | 10/2006 | Nathan et al. |
| 2006/0242234 A1 | 10/2006 | Counts et al. |
| 2006/0242554 A1 | 10/2006 | Gerace et al. |
| 2006/0253584 A1 | 11/2006 | Dixon et al. |
| 2006/0277455 A1 | 12/2006 | Yamada et al. |
| 2006/0288041 A1 | 12/2006 | Plastina et al. |
| 2007/0078993 A1 | 4/2007 | Issa |
| 2007/0106627 A1 | 5/2007 | Srivastava et al. |
| 2007/0106672 A1 | 5/2007 | Sighart et al. |
| 2007/0146820 A1 | 6/2007 | Asazu et al. |
| 2007/0157105 A1 | 7/2007 | Owens et al. |
| 2007/0161382 A1 | 7/2007 | Melinger et al. |
| 2007/0162432 A1 | 7/2007 | Armstrong et al. |
| 2007/0168543 A1 | 7/2007 | Krikorian et al. |
| 2007/0169165 A1 | 7/2007 | Crull et al. |
| 2007/0174389 A1 | 7/2007 | Armstrong et al. |
| 2007/0192299 A1 | 8/2007 | Zuckerberg et al. |
| 2007/0220092 A1 | 9/2007 | Heitzeberg et al. |
| 2007/0220554 A1 | 9/2007 | Barton et al. |
| 2007/0255785 A1 | 11/2007 | Hayashi et al. |
| 2007/0266401 A1 | 11/2007 | Hallberg |
| 2007/0277110 A1 | 11/2007 | Rogers et al. |
| 2007/0282949 A1 | 12/2007 | Fischer et al. |
| 2007/0282950 A1 | 12/2007 | Fischer et al. |
| 2008/0010372 A1 | 1/2008 | Khedouri et al. |
| 2008/0040474 A1 | 2/2008 | Zuckerberg et al. |
| 2008/0052371 A1 | 2/2008 | Partovi et al. |
| 2008/0065604 A1 | 3/2008 | Tiu et al. |
| 2008/0092054 A1 | 4/2008 | Bhumkar et al. |
| 2008/0092168 A1 | 4/2008 | Logan et al. |
| 2008/0092182 A1 | 4/2008 | Conant |
| 2008/0104521 A1 | 5/2008 | Dubinko et al. |
| 2008/0133475 A1 | 6/2008 | Fischer |
| 2008/0133593 A1 | 6/2008 | Clark |
| 2008/0133638 A1 | 6/2008 | Fischer et al. |
| 2008/0133649 A1 | 6/2008 | Pennington et al. |
| 2008/0133696 A1 | 6/2008 | Hanebeck |
| 2008/0133737 A1 | 6/2008 | Fischer et al. |
| 2008/0133763 A1 | 6/2008 | Clark et al. |
| 2008/0134039 A1 | 6/2008 | Fischer et al. |
| 2008/0134053 A1 | 6/2008 | Fischer |
| 2008/0134054 A1 | 6/2008 | Clark et al. |
| 2008/0201376 A1 | 8/2008 | Khedouri et al. |
| 2008/0320139 A1 | 12/2008 | Fukuda et al. |
| 2009/0019374 A1 | 1/2009 | Logan et al. |
| 2010/0162324 A1 | 6/2010 | Mehta et al. |

\* cited by examiner

SHARING IMAGES IN A SOCIAL NETWORK

FIELD OF THE INVENTION

The present invention relates to sharing images in a social network.

BACKGROUND OF THE INVENTION

In its short history, Internet usage has been mainly driven by portals and search engines, such as Yahoo! and Google. Recently, the rapid growth of social networking sites, such as MySpace and Facebook, has revealed a new trend of Internet usage. Social networking generally relates to services and tools that help users maintain and expand their circles of friends usually by exploiting existing relationships. Social networking sites have shown potential to become the places on the Internet where many people spend most of their time, thus making these sites the main entry point for online activity. Often times, these social networking sites can become the focal point of sharing information, such as links, multimedia, music, and the like.

In general, social networking sites and other online services of the Internet offer a mix of features and tools, such as message boards, games, journals or web logs ("blogs"). Many of these sites try to build communities around multi-media or popular culture, such as television, film, music, etc. These sites and their features are designed to keep users clicking on advertising-supported pages of the site. Thus, the known social networking sites employ a closed platform of services that attempt to keep their user-base captive to the site.

One of the popular features of many social networking sites is the sharing of images and photographs. A large number of sites, such as Flickr, are now available on the Internet to allow people to share photos with each other.

Unfortunately, these photo sharing sites still attempt to employ captive techniques that prevent open sharing of photos. Therefore, users who have accounts with different photo hosting sites have difficulty sharing these photos.

Accordingly, it may be desirable to provide methods and systems that serve as an open platform for users to automatically construct and share an album of photographs with their social network.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide for a shared photo space that is synchronized among members of a social network or group. In some embodiments, users of a social group automatically pull photos directly from all registered hard drives of clients and online services and mirror them around the group, thus making the collection available to the social network of users.

Reference will now be made in detail to the exemplary embodiments of the invention, which are illustrated in the accompanying drawings. Wherever possible, the same reference numbers will be used throughout the drawings to refer to the same or like parts.

Figure 1:
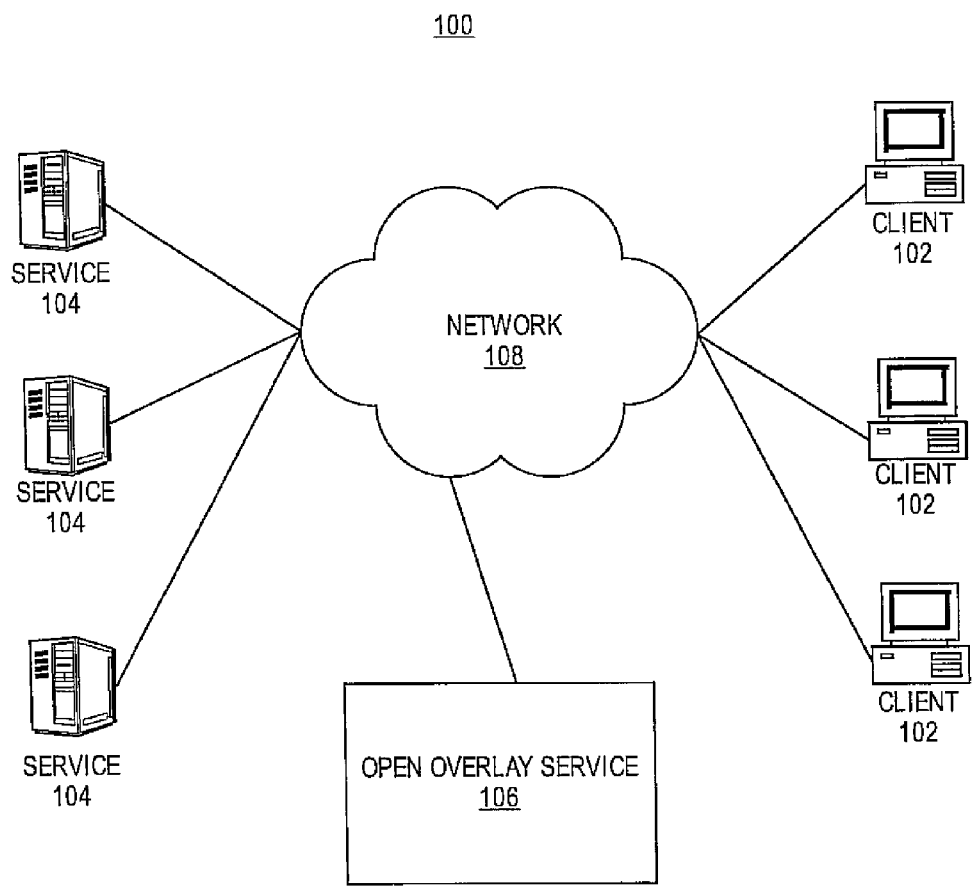
FIG. 1 illustrates an exemplary system that is in accordance with embodiments of the present invention.

FIG. 1 illustrates a system 100 that is consistent with the principles of the present invention. As shown, the system 100 may comprise one or more clients 102, a plurality of services 104, an open overlay service 106, and a network 108. In general, system 100 may be implemented on a widely available data network, such as the Internet. For example, system 100 may be implemented as a combination web site and client application that enables users and friends to participate in a live social context. These components will now be generally described.

Client 102 provides a user interface for system 100. Client 102 may be implemented using a variety of devices and software. For example client 102 may be implemented on a personal computer, workstation, or terminal. In addition, client 102 may run under an operating system, such as the LINUX operating system, the Microsoft™ Windows operating system, and the like. Client 102 may also operate through an Internet browser application, such as Firefox by Mozilla, Internet Explorer by Microsoft Corporation, or Netscape Navigator by Netscape Communications Corporation.

One skilled in the art will also recognize that client 102 may be implemented with various peripheral devices, such as a display, one or more speakers, and other suitable devices. Client 102 may also be implemented with various peripherals for accepting input from a user, such as a keyboard, a mouse, and the like. Although FIG. 1 shows a number of clients 102, system 100 may include any number of clients.

Services 104 are the applications and services that users of system 100 already use. Services 104 may be implemented on one or more servers that are well known to those skilled in the art. Rather than recreating functionality, open overlay service 106 merely interfaces services 104 and allows users to seamlessly continue using the services, such as social networking services, instant messaging, etc., that they currently use. Examples of services 104 include iTunes, Yahoo Music Engine, MySpace, Friendster, AOL Instant Messenger, Yahoo! Messenger, etc. Any sort of online service may be incorporated into the context provided by open overlay service 106.

Open overlay service 106 serves as a social network service and stores, manages, and provides access control to the various services and social networks of clients 102. In general, open overlay service 106 is essentially a web site and application service that stores and forwards information shared by users, as well as user profiles and social network information. Open overlay service 106 may be hosted as a public instance, similar in fashion to a service, such as Wikipedia. In addition, open overlay service 106 may provide various application programming interfaces that have an open specification so that anyone can create an interface.

For example, open overlay service 106 may process requests to retrieve an object, document, image file, web page, and the like. Open overlay service 106 may be implemented using a variety of devices and software. For example, open overlay service 106 may be implemented as a web site running on one or more servers that support various application programs and stored procedures.

The components of system 100 may be coupled together via network 108. Network 108 may comprise one or more networks, such as a local area network, the Internet, or other type of wide area network. In addition, network 108 may support a wide variety of known protocols, such as the transport control protocol and Internet protocol ("TCP/IP") and hypertext transport protocol ("HTTP").

Figure 2:
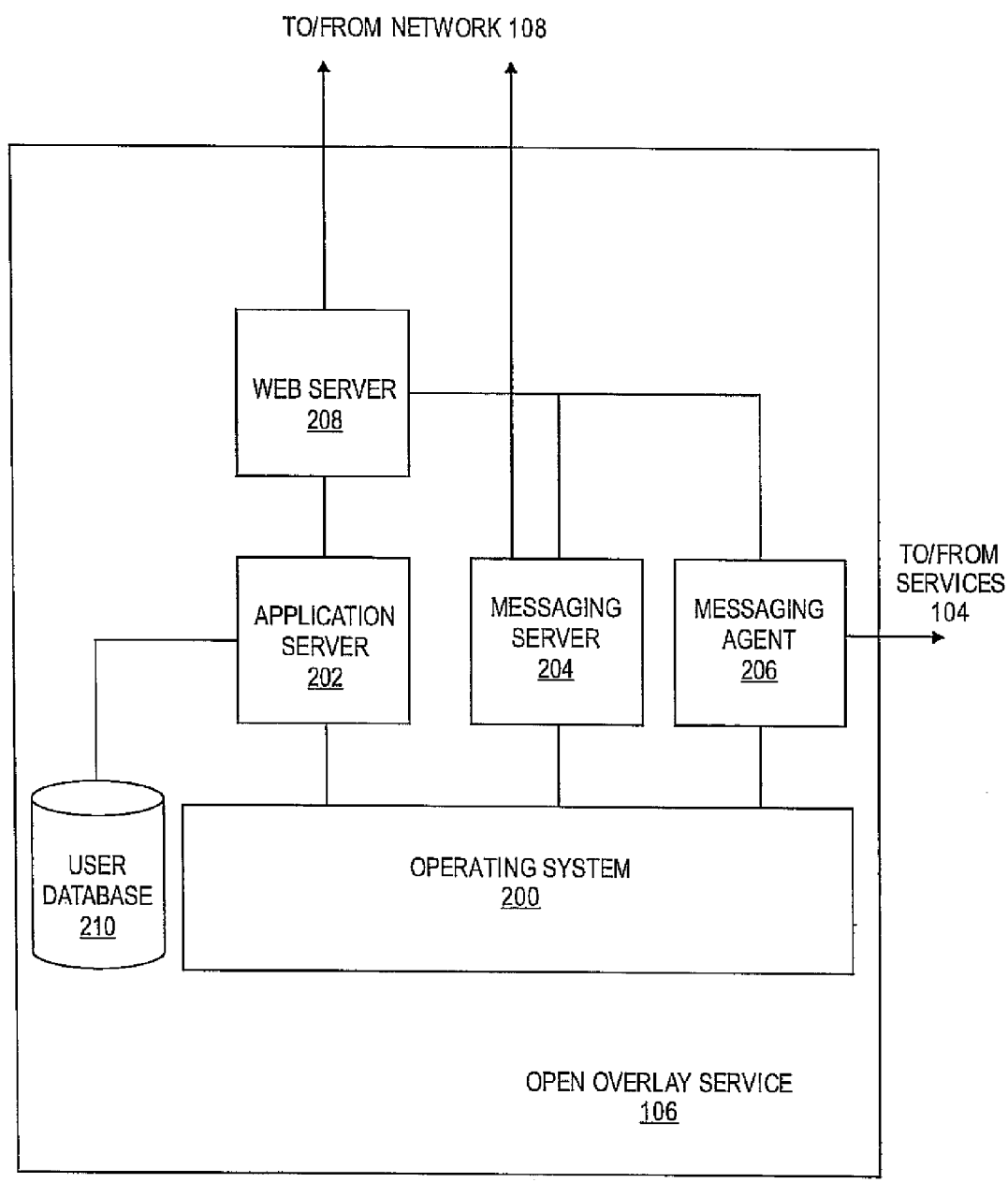
FIG. 2 illustrates an exemplary architecture for an open overlay service that is consistent with the principles of the present invention.

FIG. 2 illustrates an exemplary architecture for open overlay service 106 that is consistent with the principles of the present invention. As shown, open overlay service 106 may comprise an operating system 200, an application server 202, a messaging server 204, a messaging agent 206, a web server 208, and a user database 210. These components may be implemented as software, firmware, or some combination of both, which may be loaded into memory of the machine embodying open overlay service 106. The software components may be written in a variety of programming languages, such as C, C++, Java, etc. These components will now be generally described.

Operating system (OS) 200 is an integrated collection of routines that service the sequencing and processing of programs and applications running in open overlay service 106. OS 200 may provide many services, such as resource allocation, scheduling, input/output control, and data management. OS 200 may be predominantly software, but may also comprise partial or complete hardware implementations and firmware. Well known examples of operating systems that are consistent with the principles of the present invention include the Linux operating system, the UNIX operating system. In addition, OS 200 may operate in conjunction with other software, such as an application server, such as JBoss, to implement various features of open overlay service 106.

Application server 202 provides the logic for analyzing and managing the operations of open overlay service 106. As previously noted, application server 202 may be written in a variety of programming languages, such as C, C++, Java, etc.

For example, one responsibility of application server 202 may be managing the various identities of the users of open overlay service 106. As noted previously, a single person may have multiple identities that they use for various online services and social networks. For example, a person named, John Smith, may use jsmith@domain.com as an identity one service, but use smithj@domain2.com as his identity on another service.

In one embodiment, in order to track the various users of open overlay service 106, application server 202 may assign each user a unique identifier, such as a numeric identifier. Application server 202 may then utilize this unique identifier with the identity resources (i.e., email address, account names, screen names, etc.) used by services 104 to identify a person. In some embodiments, application server 202 generates a graph of each social network within open overlay service 106 in terms of person's names and the identity resources from the point of view of a particular user based on what is trusted by that user.

For example, given information about a person's name, their unique identifier assigned by application server 202, and associations to identity resources trusted by other users, application server 202 can generate a list of person names and identity resources (i.e., email address, account names, etc.) that should be visible to a particular user. Hence, the particular user will only be allowed to see identity resources they happen to (or only) know about that user and identity resources that have been verified by application server 202. For example, a user A may have a unique identifier of 2345, and email address #1 and email address #2 as identity resources. A user B may only know about email address #1 for user A. Meanwhile, a user C may similarly only know about email address #2 for user A. Thus, for user B, application server 202 will only allow user B to view and use email address #1 as an identity resource for user A. Likewise, application server 202 will only allow user C to view and use email address #2 as an identity resource for user A. However, if user A subsequently explicitly indicates to application server 202 that both users B and C can be trusted, then users B and C will then be also allowed to view both email addresses #1 and 2, as well. The primary uses of this information by open overlay service 106 may be for sharing a link with person by addressing that person either by an email address or by a short nickname, or for viewing a list of persons in open overlay service 106 that they ink they know.

Application server 202 may also determine what information of a user should be public or private. In some embodiments, application server 202 may default to making information public, but provide an option, such as a checkbox, that allows the user to designate information as private. Application server 202 may also employ per page settings, such as all private or all public. Other privacy policies may be implemented by application server 202.

Application server 202 may further provide various search features. For example, application server 202 may allow users to search for other users based on various criteria, such as age, gender, school, etc. Application server 202 may also allow searches for various resources, such as email addresses, topics, links, etc.

Messaging server 204 manages communications between open overlay service 106 and clients 102 via network 108. For example, messaging server 204 may be configured to periodically poll clients 102 on a regular basis and have them request information from services 104. Messaging server 204 may be implemented based on well-known hardware and software and utilize well-known protocols, such as TCP/IP, hypertext transport protocol, etc.

Messaging server 204 may be configured to handle a wide variety of data and may handle data that is in any format. For example, information from clients 102 may be in the form of an extensible markup language (XML) file or a network location, such as a uniform resource locator (URL) on the Internet. Alternatively, messaging server 204 may be configured to obtain information from services 104 directly in a peer-to-peer fashion.

Messaging agent 206 serves as an interface between open overlay service 106 and online services 104 and may operate to monitor the activity of clients 102 at these services. In particular, messaging agent 206 may be a relatively small and focused computer application (or "bot") that runs continuously, in the background simultaneously for each of clients 102, as other programs are being run, and responds automatically to activity on services 104 that may be of interest to clients 102, such as new messages, postings, and the like.

Messaging agent 206 may be created by open overlay service 106 (i.e., by application server 202) for the benefit of the users at clients 102. Alternatively, for example, messaging server 204 may send information to clients 102 upon request, perform automated searches, or monitor messages or events at services 104.

In one embodiment, messaging server 204 and/or messaging agent 206 may work in conjunction to perform client-side data scraping on services 104. Client-side data scraping may be desirable in some instances where services 104 refuse or block a direct interface with open overlay service 106. For example, MySpace and AOL's instant messaging service may be implemented as one of services 104, but is known to block proxy requests for a client.

Client-side data scraping may be initiated by messaging server 204 or using information provided by messaging server. Messaging server 204 may poll client overlay client 302 to trigger a request to one of services 104. Accordingly, overlay client 302 may cause one of service applications 306 to interface with service 104 and request data from that service, such as web page refresh. Since the request originated from client 102, service 104 will provide a response. Overlay client 302 may detect this response and forward it to messaging server 204. Messaging server 204 may then pass this response. Of course, the polling may be configured at overlay client 302 based on information provided to messaging server 204.

Messaging server 204 evaluates the response and determines if a notification event is needed. If notification is needed, messaging server 204 send a message to overlay client 302. The notification may then be displayed to the user using, for example, browser 304 or service application 306.

One application of client-side data scraping may be used to detect when messages or postings have been entered on one of services 104. For example, on MySpace, users often repeatedly refresh their pages in anticipation of receiving a post or message from a friend. With client-side data scraping, open overlay service 106 may automatically perform this unction, and more conveniently, indicate when the user has received activity on their MySpace page. This notification may appear in the form of a pop-up bubble or may be displayed as a link on the user's page in open overlay service 106. Of course, other applications of client-side data scraping are consistent with the principles of the present invention.

Web server 208 provides a communications interface between open overlay service 106, clients 102, and services 104. For example, web server 208 may be configured to provide information that indicates the status of client 102. Such communications may be based on well known protocols and programming languages, such as HTTP, TCP/IP and Java. Interfaces provided by web server 208 may be implemented using well known Internet technologies, such as web pages, which are well known to those skilled in the art.

User database 210 maintains information identifying users and clients 102. User database 210 may be implemented using well known database technology, such as relational databases, or object oriented databases.

For example, user database 210 may include information indicating one or more operating systems and applications installed on clients 102 as well as services subscribed to by users. User database 210 may also comprise information related to authenticating a user determining the respective rights of a user relative to other users. For example, a user may select various groups or channels of content in which they are interested in receiving information. User database 210 may further include information that indicates the permissions and delivery of the information to clients 102. Other information that may be included in user database 210 may comprise information, such as system and individual permissions of clients 102 on services 104, activation keys, registration information, and payment information (such as credit card information).

Furthermore, user database 210 may include other information related to the manner in which open overlay service 106 communicates with clients 102. For example, this information may relate to periodicity of notifications, email addresses, format of the information, and the lice. User database 210 may include data structures to log the activities and transactions of its users. Activities, such as recent links, history of operations, etc., that may be logged in user database 210 are well known to those skilled in the art.

Figure 3:
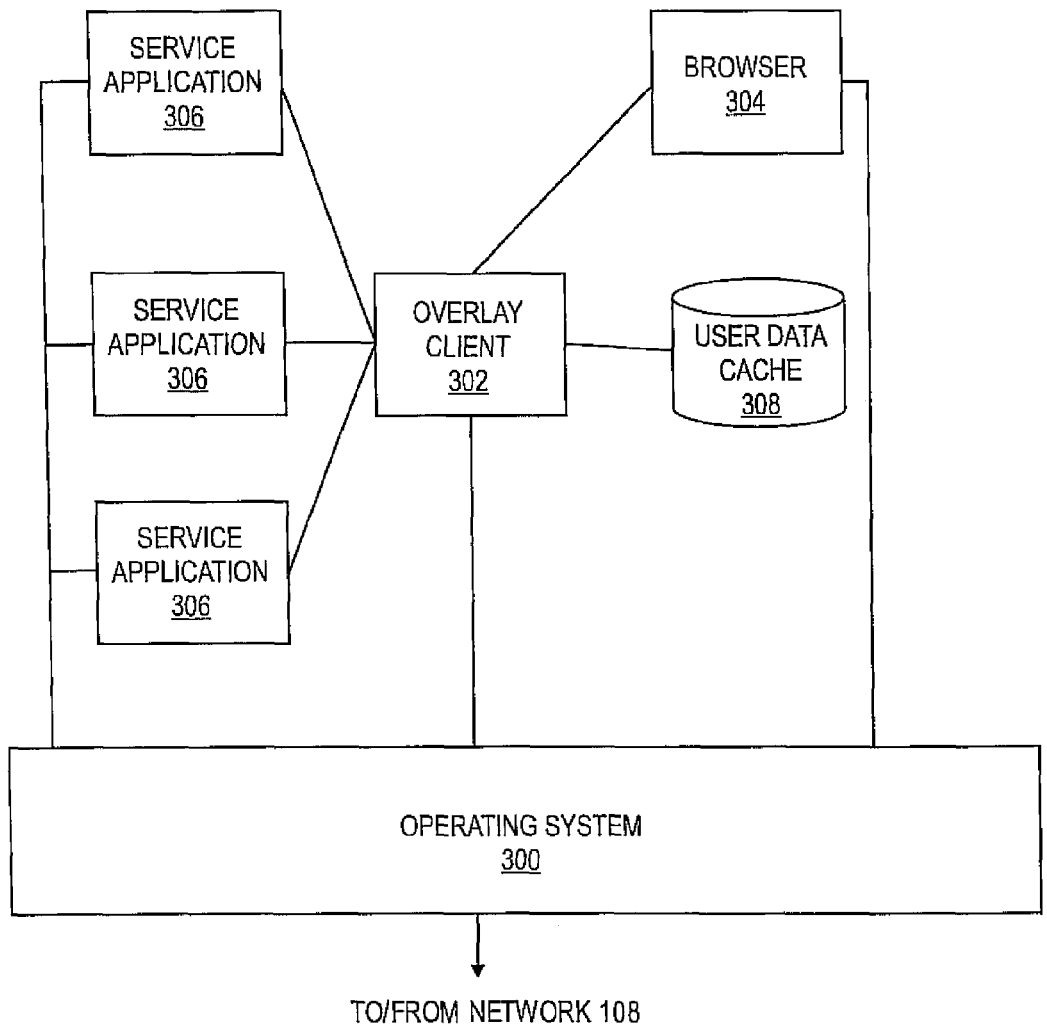
FIG. 3 illustrates an exemplary architecture for clients that are consistent with the principles of the present invention.

FIG. 3 illustrates an exemplary architecture for clients 102 that are consistent with the principles of the present invention. As noted, clients 102 may be implemented on a conventional device, such as personal computer, laptop, and the like. Such devices are well known to those skilled in the art and may typically include hardware, such as a processor, a memory, a display, a storage device, a keyboard, a mouse, and a network interface for network 108. Such hardware supports the operation of various components software. As shown, the software running on client 102 may comprise an operating system 300, an overlay client 302, a browser 304, one or more service applications 306, and a user data cache 308. Each of these software components will now be generally described.

Operating system (OS) 300 is an integrated collection of routines that service the sequencing and processing of programs and applications running in open overlay service 106. OS 300 may provide many services, such as resource allocation, scheduling, input/output control, and data management. OS 300 may be predominantly software, but may also comprise partial or complete hardware implementations and firmware. Well known examples of operating systems that are consistent with the principles of the present invention include Mac OS by Apple Computer, the Windows family of operating systems by Microsoft Corporation, and the Linux operating system.

Overlay client 302 maintains an inventory of the software and service applications 306 installed on client 102 and archives one or more states of activity on client 102. In some embodiments, overlay client 302 may be configured to periodically connect to open overlay service 106 and perform various operations requested by open overlay service 106.

Browser 304 is an application that runs on client 102 and provides an interface to access information on network 108, such as information on services 104. Browser 304 may be implemented as well known programs, such as Mozilla Firefox, Microsoft Internet Explorer, Netscape Navigator, and the like.

Service applications 306 run on client 102 to support the services provided by services 104. For example, service applications 306 may be applications, such as a browser, an instant messaging client, a music player (such as iTunes), and the like that are provided from services 104. Other examples for applications 306 are well known to those skilled in the art.

User data cache 308 provides a cache that indicates the activity of a user at client 102. For example, user data cache 308 may include information that indicates documents, such as HTML pages, images, URL links, web site access times, and the like.

In order to illustrate some of the features of open overlay service 106 that provide a live social context, some features will now be described. One feature of open overlay service 106 may be a service that automatically creates a shared photo album space that is synchronized among all members in a social network, such as a family or group of friends. For example, open overlay service 106 may periodically retrieve photos from clients 102 and online services 104, establish a shared photo space, and mirror these photos around the group.

In contrast to conventional shared photo services, open overlay service 106 does not rely on the users selecting a "share" link action, nor does it modify the original photo sets of the users. Instead, open overlay service 106 pulls the photos from multiple locations and online services to build a shared pool of photographs and builds a unified album from this pool of photographs automatically with little or no interaction by the users in the social network.

Figure 4:
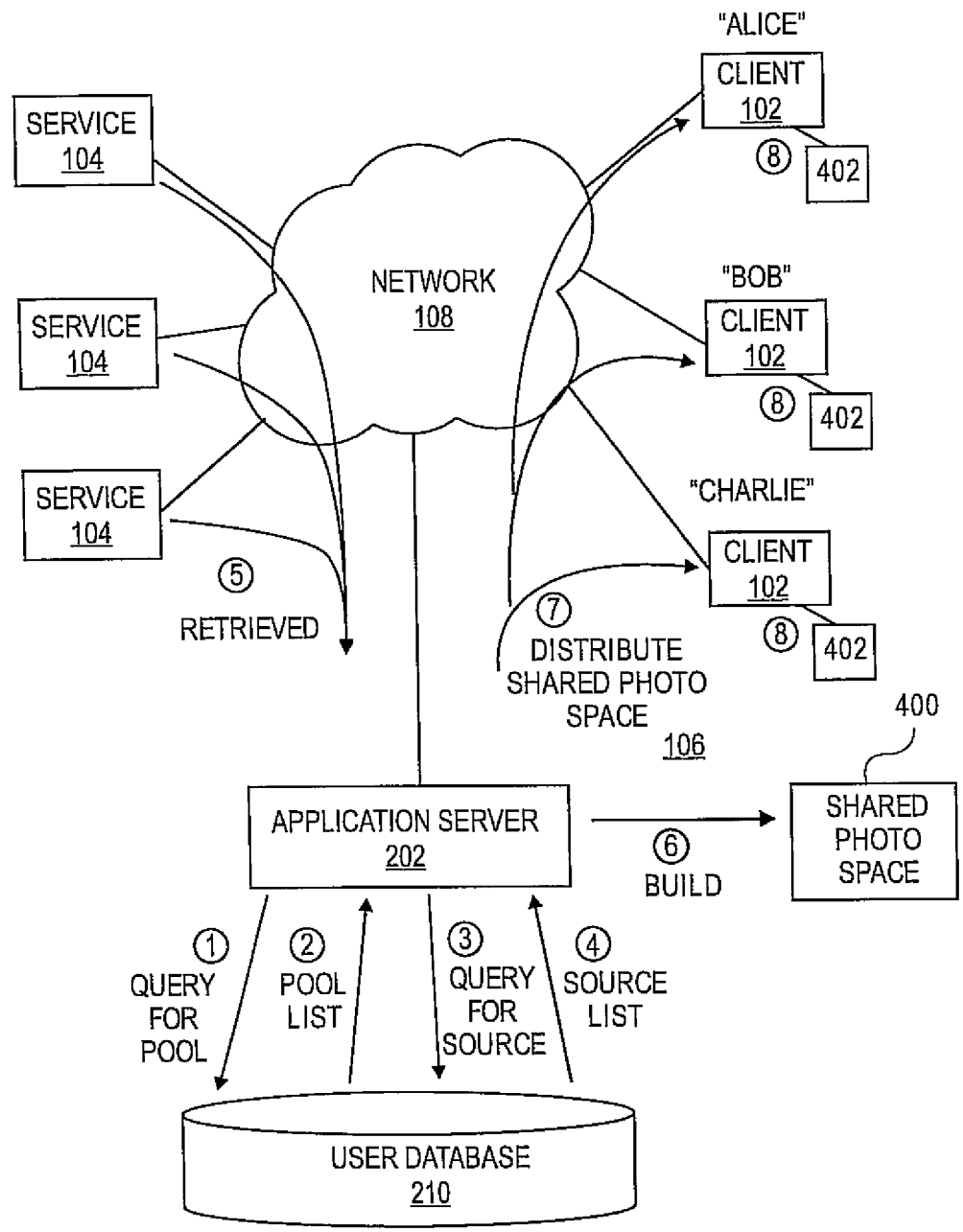
FIG. 4 illustrates a feature of the open overlay service for automatically constructing a shared photo album in accordance with the principles of the present invention

FIG. 4 illustrates a feature of open overlay service 106 for automatically constructing a shared photo album in accordance with the principles of the present invention. For purposes of illustration, FIG. 4 shows a scenario where one of clients 102, labeled "Alice", shares a photo album constructed from shared photos sourced from the other clients 102, which are labeled "Bob" and "Charlie". Exemplary operations for constructing the shared photo album will now be described.

In general, open overlay service 106 and clients 102 cooperate to automatically construct a shared photo album that displays images from a photo collection generated from the user and that of user's social network automatically. Initially, application server 202 queries database 210 to retrieve a list of users and groups that are of interest or known to Alice. For example, Alice may be interested in having a shared photo album with her school friends, her family, etc. In addition, Alice may be interested in sharing photos with a group, such as a fan club, a sports team, etc. In response, database 210 may provide a list of "friends" that comprise the users and groups matching this query. For purposes of this illustration, FIG. 4 shows clients 102, Bob and Charlie are friends of Alice.

For each of these "friends" of Alice, application server 202 then queries database 210 to retrieve a list of sources 104 for that friend. For example, these sources may be online photo sharing services, such as Flickr, Yahoo Photos, Picasa, or PhotoBucket, that open overlay service 106 may interface. Alternatively, some of these sources may be other clients 102 having photos on their local hard drives. Other sources, such as a public peer-to-peer storage services and devices, may also be sources used by the friends.

For each source, open overlay service 106 then retrieves a set of photos from across the photo sources. In order to retrieve the content, open overlay service 106 may utilize the client-side data scraping techniques described above. This ensures that open overlay service 106 only retrieves photos that are properly accessible by Alice, Bob, and Charlie.

Application server 202 then constructs a shared photo space in data base 210. This shared photo space may be accessible based on the preferences of one or more users. For example, a designated administrator of the social network of Alice, Bob, and Charlie may elect to keep the shared photo space completely private, public, or some combination of public and private.

Application server 202 then distributes the photos or pointers to where the photos exist to Alice, Bob, and Charlie. The photos may then be displayed using another application, such as web browser 304 or overlay client 302, or a dedicated one of service applications 306 that is controlled, for example, by overlay client 302. One skilled in the art will recognize that there is wide variety of ways that the photos can be distributed and displayed to clients 102.

Application server 202 may also filter the some of the photos distributed to one of the users, such as Alice based on Alice's profile or other criteria. For example, application server 202 may filter the photos based on various criteria, such as Alice's age, Alice's location, Alice's other activities in open overlay service 106 as indicated in cache 308, etc.

Application server 202 may distribute photos, for example, to Alice in web browser 304 running on client 102. Alternatively, application server 202 may retrieve the photos from the source and pass the photo data to overlay client 302 running on client 102. As another alternative, application server 202 may provide a pointer to overlay client 302 where it can retrieve the photos from the original source, such as a hard drive or online photo service. For example, overlay client 302 may be routed to a hosted online photo service to retrieve the photos or may be routed to Bob or Charlie in a peer-to-peer fashion.

Furthermore, application server 202 may distribute the photos with accompanying information. For example, this accompanying information may be information that indicates the owner of the photo or descriptive phrases or comments about the photo. Alternatively, the accompanying information may be a corresponding audio track or clip.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method comprising:
receiving, by a processor, an access to a first online image source from a first member among a plurality of members of a social network;
receiving, by the processor, an access to a second online image source from a second member among the plurality of members of the social network, wherein the second online image source is not accessible by the first member of the social network;
in response to a first image added to the first online image source, collecting, by the processor, without receiving instructions from the first member to share the first image, the first image from the first online image source into a shared storage space;
in response to a second image added to the second online image source, collecting, by the processor, without receiving instructions from the second member to share the second image, the second image from the second online image source into the shared storage space; and
distributing, by the processor, the first and the second collected images to each of the plurality of members of the social network, wherein the distributing comprising distributing a first pointer to the first online image source of the first collected image and distributing a second pointer to a second online image source of the second collected image.

2. The method of claim 1, further comprising: providing information that indicates the first online image source of the first image that is collected; and providing information that indicates the second online image source of the second image that is collected.

3. The method of claim 1, wherein the collecting, without receiving instructions from the first member to share the first image, the first image from the first online image source comprises accessing a first account of the first member for the first online image source and collecting the first image from the first online image source using the first account, wherein the collecting, without receiving instructions from the second member to share the second image, the second image from the second online image source comprises accessing a second account of the second member for the second online image source and collecting the second image from the second online image source using the second account.

4. The method of claim 1, wherein the distributing the first and the second collected images comprises distributing copies of the first and the second images.

5. A method comprising:
receiving, by a processor, information that indicates a social network of users interested in sharing a plurality of images;
determining, by the processor, a first online location of a first image among the plurality of images of a first user among the social network of users;
determining, by the processor, a second online location of a second image among the plurality of images of a second user among the social network of users, wherein the second online location of second image is inaccessible to the first user;

in response to the first image among the plurality of images added to the location, collecting, by the processor, without receiving instructions from the first user to share the first image of the first user, the first image from the first online location into a shared storage space;

in response to the second image among the plurality of images added to the location, collecting, by the processor, without receiving instructions from the second user to share the second image of the second user, the second image from the first online location into a shared storage space; and distributing, by the processor, the first and the second collected images to each of the interested users of the social network, wherein the distributing comprising distributing a first pointer to the first online location of the first collected image and distributing a second pointer to a second online location of the second collected image.

6. The method of claim 5, wherein the collecting, without receiving instructions from the first user to share the first image, the first image of the first user comprises accessing the first online location using a first account of the first user and wherein the collecting, without receiving instructions from the second user to share the second image, the second image of the second user comprises accessing the second online location using a second account of the second user.

7. The method of claim 6, further comprising: retrieving the first image of the first user from the first account of the first user on a first service; and retrieving the second image of the second user from the second account of the second user on a second service.

8. The method of claim 6, further comprising: retrieving the first pointer to the first online location of the first image of the first user from the first account of the first user; and retrieving the second pointer to the second online location of the second image of the second user from the second account of the second user.

9. The method of claim 5, wherein the distributing the first and the second collected images comprises distributing copies of the first and the second collected images.

10. A system comprising:
a memory;
a processor operatively coupled to the memory, to:
receive an access to a first online image source from a first member among a plurality of members of a social network;
receive an access to a second online image source from a second member among the plurality of members of the social network, wherein the second online image source is not accessible by the first member of the social network;
in response to a first image added to the first online image source, collect without receiving instructions from the first member to share the first image, the first image from the first online image source into a shared storage space;
in response to a second image added to the second online image source, collect without receiving instructions from the second member to share the second image, the second image from the second online image source into the shared storage space; and
distribute the first and the second collected images to each of the plurality of members of the social network, wherein the distribute comprises distribute a first pointer to the first online image source of the first collected image and distribute a second pointer to a second online image source of the second collected image.

11. The system of claim 10, the processor to: provide information that indicates the first online image source of the first image that is collected; and provide information that indicates the second online image source of the second image that is collected.

12. The system of claim 10, wherein the collect, without receiving instructions from the first member to share the first image, the first image from the first online image source comprises to access a first account of the first member for the first online image source and collect the first image from the first online image source using the first account, wherein the collect, without receiving instructions from the second member to share the second image, the second image from the second online image source comprises to access a second account of the second member for the second online image source and collect the second image from the second online image source using the second account.

13. The system of claim 10, wherein the distribute the first and second collected images comprises distribute copies of the first and the second images.

14. A non-transitory computer readable storage medium having instructions stored thereon that, when executed by a processor, cause the processor to:
receive, by the processor, to a first online image source from a first member among a plurality of members of a social network;
receive, by the processor, an access to a second online image source from a second member among the plurality of members of the social network, wherein the second online image source is not accessible by the first member of the social network;
in response to a first image added to the first online image source, collect without receiving instructions from the first member to share the first image, the first image from the first online image source into a shared storage space;
in response to a second image added to the second online image source, collect, by the processor, without receiving instructions from the second member to share the second image, the second image from the second online image source into the shared storage space; and
distribute, by the processor, the first and the second collected images to each of the plurality of members of the social network, wherein the distribute comprises distribute a first pointer to the first online image source of the first collected image and distribute a second pointer to a second online image source of the second collected image.

15. The non-transitory machine-readable storage medium of claim 14, the processor to: provide information that indicates the first online image source of the first image that is collected; and provide information that indicates the second online image source of the second image that is collected.

16. The non-transitory machine-readable storage medium of claim 14, wherein the collect, without receiving instructions from the first member to share the first image, the first image from the first online image source comprises to access a first account of the first member for the first online image source and collect the first image from the first online image source using the first account, wherein the collect, without receiving instructions from the second member to share the second image, the second image from the second online image source comprises to access a second account of the second member for the second online image source and collect the second image from the second online image source using the second account.

17. The non-transitory machine-readable storage medium of claim 14, wherein the distribute the first and the second collected images comprises distribute copies of the first and the second images.

\* \* \* \* \*